United States Patent
Wu et al.

(10) Patent No.: US 12,477,176 B2
(45) Date of Patent: Nov. 18, 2025

(54) MULTIMEDIA BROADCAST MONITORING METHOD AND SYSTEM, AND ELECTRONIC DEVICE

(71) Applicant: BOE TECHNOLOGY GROUP CO., LTD., Beijing (CN)

(72) Inventors: Yanhong Wu, Beijing (CN); Hao Fang, Beijing (CN); Yan Gao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/029,477

(22) PCT Filed: May 18, 2022

(86) PCT No.: PCT/CN2022/093467
§ 371 (c)(1),
(2) Date: Mar. 30, 2023

(87) PCT Pub. No.: WO2023/220956
PCT Pub. Date: Nov. 23, 2023

(65) Prior Publication Data
US 2024/0364963 A1   Oct. 31, 2024

(51) Int. Cl.
*H04N 21/442* (2011.01)
*H04N 21/44* (2011.01)

(52) U.S. Cl.
CPC ..... *H04N 21/442* (2013.01); *H04N 21/44008* (2013.01)

(58) Field of Classification Search
None
See application file for complete search history.

(56) References Cited

U.S. PATENT DOCUMENTS

| | | | |
|---|---|---|---|
| 2014/0270338 A1* | 9/2014 | Zhao | G06T 1/0028 382/100 |
| 2018/0270388 A1* | 9/2018 | Gharaibeh | H04N 1/32203 |
| 2022/0067129 A1* | 3/2022 | Kumar | H04N 21/8352 |

FOREIGN PATENT DOCUMENTS

| | | |
|---|---|---|
| CN | 102131109 A | 7/2011 |
| CN | 103002338 A | 3/2013 |

(Continued)

*Primary Examiner* — Omar S Parra
(74) *Attorney, Agent, or Firm* — HOUTTEMAN LAW LLC

(57) ABSTRACT

The present disclosure provides multimedia broadcast monitoring method and system, and an electronic device. The method includes generating a first verification image of a play plan according to a pre-generated first identification image and configuration information of a display terminal, the first identification image being configured to represent first identity authentication information configured to represent the play plan; generating to-be-displayed data according to the play plan, a multimedia file corresponding to the play plan, and the first verification image, so that the display terminal performs display in response to the to-be displayed data; receiving and analyzing a display image sent by the display terminal, and after a second identification image is derived from the display image, acquiring second identity authentication information; and comparing the second identity authentication information with the first identity authentication information, and determining whether the display image is correct according to a comparison result.

15 Claims, 6 Drawing Sheets

(56) References Cited

FOREIGN PATENT DOCUMENTS

| | | |
|---|---|---|
| CN | 103731634 A | 4/2014 |
| CN | 103763624 A | 4/2014 |
| CN | 107993087 A | 5/2018 |
| CN | 108012189 A | 5/2018 |
| CN | 109791579 A | 5/2019 |
| CN | 111343486 A | 6/2020 |
| CN | 111698325 A | 9/2020 |
| CN | 112148896 A | 12/2020 |

\* cited by examiner

MULTIMEDIA BROADCAST MONITORING METHOD AND SYSTEM, AND ELECTRONIC DEVICE

CROSS-REFERENCE TO RELATED APPLICATION

This is a National Phase Application filed under 35 U.S.C. 371 as a national stage of PCT/CN2022/093467, filed on May 18, 2022, the contents of which are incorporated herein by reference in their entirety.

TECHNICAL FIELD

The present disclosure belongs to the technical field of media transmission, and particularly relates to a multimedia broadcast monitoring method and system, and an electronic device.

BACKGROUND

For published multimedia content, if a playing condition of the multimedia content finally displayed on a display screen of a terminal, for example, whether the multimedia content is displayed on time or whether the displayed content is correct, needs to be monitored, two traditional solutions may be adopted. One is to perform remote broadcast monitoring by means of manual patrol, but this solution is high in labor cost and low in detection efficiency and detection accuracy, and execution efficiency of countermeasures is low when it is detected that the displayed content is wrong. The other is to perform optical broadcast monitoring through a camera disposed outside the display screen and realize analysis and detection of the multimedia content by algorithms, but this solution requires to provide a broadcast monitoring camera for each display screen, and install the camera at a specific height and a specific angle, a structure, and a wiring project of the camera in the installation process are often limited by application scenarios, and thus this solution is hard to be carried out on site.

SUMMARY

In order to solve at least one of the technical problems in the related art, the present disclosure provides a multimedia broadcast monitoring method, a multimedia broadcast monitoring system, and an electronic device.

In a first aspect, a technical solution adopted to solve the technical problem of the present disclosure is a multimedia broadcast monitoring method, including:
   generating a first verification image of a play plan by an image generation algorithm according to a pre-generated first identification image and configuration information of a display terminal; wherein the first identification image is configured to represent first identity authentication information; and the first identity authentication information is configured to represent the play plan in a play schedule;
   generating data to be displayed according to the play plan, a multimedia file corresponding to the play plan, and the first verification image that are received, so as to allow the display terminal to perform display in response to the data to be displayed;
   receiving a display image sent by the display terminal, analyzing the display image, and acquiring, after a second identification image is derived from the display image through analysis, second identity authentication information corresponding to the second identification image when it is determined that the second identification image is consistent with the first identification image; and
   comparing the second identity authentication information with the first identity authentication information, and determining whether the display image of the display terminal is correct according to a comparison result.

In some exemplary embodiments, generating the first verification image of the play plan by the image generation algorithm according to the pre-generated first identification image and the configuration information of the display terminal includes: generating the first identification image according to the first identity authentication information;
   processing the first identification image according to the number of pixels corresponding to a specific area of a pre-generated transparent image to obtain a first target identification image;
   encoding display information of all pixels of the first target identification image to obtain first encoded data; and
   replacing display data of corresponding pixels in the specific area of the transparent image with the first encoded data to generate the first verification image.

In some exemplary embodiments, after generating the first identification image according to the first identity authentication information, the multimedia broadcast monitoring method further includes:
   generating the transparent image according to resolution information of the display terminal; wherein resolution of the transparent image is the same as that of the display terminal.

In some exemplary embodiments, the transparent image has a central area and an edge area surrounding the central area; and the specific area is the edge area.

In some exemplary embodiments, when the number of the pixels in the specific area is greater than the number of pixels in the first target identification image, replacing the display data of the corresponding pixels in the specific area of the transparent image with the first encoded data to generate the first verification image includes:
   replacing display data of other pixels than the corresponding pixels of the first target identification image in the specific area of the transparent image with second encoded data while the display data of the corresponding pixels in the specific area of the transparent image are replaced with the first encoded data, so as to obtain the first verification image.

In some exemplary embodiments, a step of analyzing the display image to determine whether the display image of the display terminal is correct includes:
   analyzing the display image to obtain an identification image actually displayed by the display terminal;
   processing the identification image actually displayed, and obtaining the second identification image according to resolution information of the first identification image;
   comparing the second identification image with the first identification image, and determining that the display image is wrong if the second identification image is not consistent with the first identification image;
   acquiring the second identity authentication information according to the second identification image if the second identification image is consistent with the first identification image; and comparing the second identity authentication information with the first identity authentication information to determine whether the display image is correct.

In some exemplary embodiments, processing the identification image actually displayed and obtaining the second identification image according to the resolution information of the first identification image includes:

processing the identification image actually displayed according to the number of the pixels corresponding to the specific area of the transparent image to obtain a second target identification image;

determining whether target encoded data obtained by encoding display information of all pixels in the second target identification image exist;

decoding the target encoded data to obtain decoded data if it is determined that the target encoded data obtained by encoding the display information of all pixels in the second target identification image exist; and generating the second identification image according to the resolution information of the first identification image and the decoded data.

In some exemplary embodiments, encoding the display information of all pixel of the first target identification image to obtain the first encoded data includes:

sequentially encoding the display information of all pixels of the first target identification image in a first preset order to obtain the first encoded data; and processing the identification image actually displayed according to the number of the pixels corresponding to the specific area of the transparent image to obtain the second target identification image includes:

sequentially assembling display data of all pixels in the identification image actually displayed in the first preset order according to the number of the pixels corresponding to the specific area of the transparent image, so as to obtain the second target identification image.

In some exemplary embodiments, replacing the display data of the corresponding pixels in the specific area of the transparent image with the first encoded data to generate the first verification image includes:

sequentially replacing the display data of the corresponding pixels in the specific area of the transparent image with the first encoded data in a preset order to generate the first verification image; and analyzing the display image to obtain the identification image actually displayed by the display terminal includes:

sequentially extracting the display data of the corresponding pixels in the specific area of the display image in the preset order, and obtaining the identification image actually displayed by the display terminal according to the extracted display data.

In some exemplary embodiments, the play plan includes playback window information and play order information of each multimedia file in the display terminal; and generating the data to be displayed according to the play plan, the multimedia file corresponding to the play plan, and the first verification image that are received includes:

generating the data to be displayed according to display region information and display order information of each multimedia file in the display terminal, the multimedia file corresponding to the play plan, and the first verification image, so as to allow the display terminal to perform display according to the playback window information and the play order information of each multimedia file in the display terminal in response to the data to be displayed.

In some exemplary embodiments, while the display image is analyzed, the method further includes:

when it is determined that the display image is not correct, sending a control instruction to cancel display to the display terminal, so as to allow the display terminal to cancel display of the display image, and generate an alarm message.

In some exemplary embodiments, the multimedia broadcast monitoring method further includes:

encoding parameter information in the play plan, and generating the first identity authentication information.

In a second aspect, an embodiment of the present disclosure further provides a multimedia broadcast monitoring system, including a verification image generation module, a playback control module, an analysis module, and a display terminal; wherein the verification image generation module is configured to generate a first verification image of a play plan by an image generation algorithm according to a pre-generated first identification image and configuration information of a display terminal; the first identification image is configured to represent first identity authentication information; and the first identity authentication information is configured to represent the play plan in a play schedule;

the playback control module is configured to generate, according to the play plan, a multimedia file corresponding to the play plan, and the first verification image that are received, data to be displayed for the display terminal to display;

the display terminal is configured to perform display in response to the data to be displayed, and capture a currently displayed image at a preset frequency as a display image; and the analysis module is configured to analyze the display image, acquire, after a second identification image is derived from the display image through analysis, second identity authentication information corresponding to the second identification image when it is determined that the second identification image is consistent with the first identification image, compare the second identity authentication information with the first identity authentication information, and determine whether the display image of the display terminal is correct according to a comparison result.

In a third aspect, an embodiment of the present disclosure further provides a computer device, including: a processor, a storage device, and a bus; wherein the storage device stores machine-readable instructions executable by the processor, and when the computer device operates, the processor communicates with the storage device through the bus, and the machine-readable instructions perform steps of the multimedia broadcast monitoring method provided in the first aspect or steps of any one multimedia broadcast monitoring method provided in the first aspect when being executed by the processor.

In a fourth aspect, an embodiment of the present disclosure further provides a non-transitory computer-readable storage medium having a computer program stored thereon, and the computer program performs steps of the multimedia broadcast monitoring method provided in the first aspect or steps of any one multimedia broadcast monitoring method provided in the first aspect when being executed by a processor.

In a fifth aspect, an embodiment of the present disclosure further provides an electronic device, including the multimedia broadcast monitoring system described in the second aspect and a display terminal.

DETAIL DESCRIPTION OF EMBODIMENTS

In order to enable those of ordinary skill in the art to better understand the technical solutions of the present disclosure the present disclosure is further described in detail below with reference to the drawings and specific embodiments.

Unless otherwise defined, technical terms or scientific terms used herein should have general meanings that are understood by those of ordinary skill in the technical field to which the present disclosure belongs. The words "first", "second" and the like used herein do not denote any order, quantity or importance, but are just used to distinguish between different elements. Similarly, the words "one", "a", "the" and the like do not denote a limitation to quantity, and indicate the existence of "at least one" instead. The words "include", "comprise" and the like indicate that an element or object before the words covers the elements or objects listed after the words or the equivalents thereof, rather than excluding other elements or objects. The words "connect", "couple" and the like are not restricted to physical or mechanical connection, but may also indicate electrical connection, whether direct or indirect. The words "on", "under", "left", "right" and the like are only used to indicate relative positional relationships. When an absolute position of an object described is changed, the relative positional relationships may also be changed accordingly.

Figure 1:
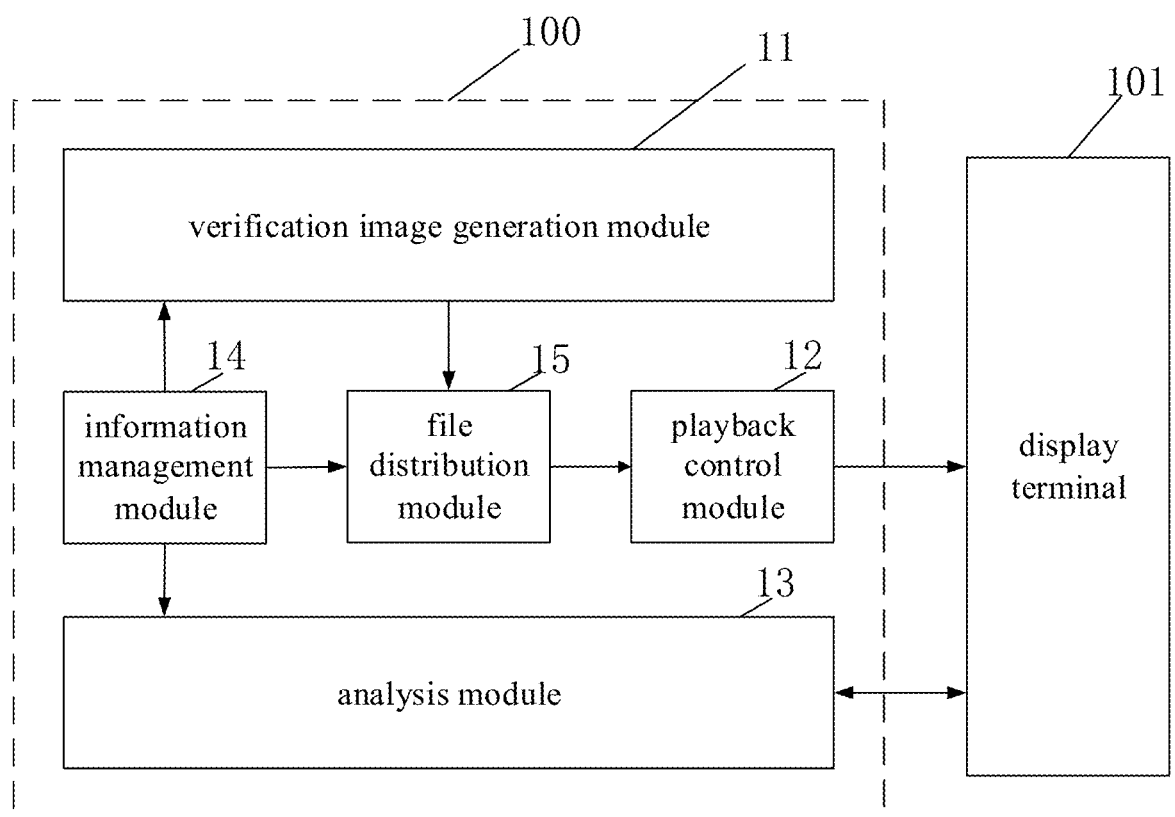
FIG. 1 is a schematic structural diagram of a multimedia broadcast monitoring system according to an embodiment of the present disclosure.

In a first aspect, FIG. 1 is a schematic structural diagram of a multimedia broadcast monitoring system according to an embodiment of the present disclosure. As shown in FIG. 1, the multimedia broadcast monitoring system 100 is configured to monitor display content of a display terminal 101, so as to inform a user of a current display condition of the display terminal 101. The multimedia broadcast monitoring system 100 includes a verification image generation module 11, a playback control module 12, and an analysis module 13.

The verification image generation module 11 is configured to generate a first verification image of a play plan by an image generation algorithm according to a pre-generated first identification image and configuration information of the display terminal 101. The first identification image is generated according to first identity authentication information, and is configured to represent the first identity authentication information; and the first identity authentication information is generated by an information management module 14 according to the play plan in a play schedule, and is configured to represent the play plan in the play schedule. The play schedule is generated by the information management module 14 using parameter information of at least one play plan.

It should be noted that one play plan corresponds to one piece of first identity authentication information, and one piece of first identity authentication information corresponds to one first identification image. In a case where the play schedule includes a plurality of play plans, the first verification image corresponding to each play plan may be respectively generated by the image generation algorithm.

In some exemplary embodiments, by using the first identity authentication information and the configuration information of the display terminal 101 as input data of the image generation algorithm, the first verification image of the play plan may be generated through processing by the image generation algorithm.

In some exemplary embodiments, the verification image generation module 11 is configured to send the first verification image of the play plan to a distribution control module, so that the distribution control module can send a play plan to be played currently, the first verification image of the play plan, and a multimedia file corresponding to the play plan to the playback control module 12 at the same time according to the play schedule.

The playback control module 12 is configured to generate, according to the received play plan, multimedia file corresponding to the play plan, and first verification image, data to be displayed for the display terminal 101 to display. The data to be displayed specifically include the play plan, the multimedia file corresponding to the play plan, and the first verification image.

The playback control module 12 may send the data to be displayed to the display terminal 101 for display through a High Definition Multimedia Interface (HDMI).

The analysis module 13 is configured to analyze a display image which is captured by the display terminal 101 at a preset frequency, acquire, after obtaining a second identification image through analysis and determining that the second identification image is consistent with the first identification image, second identity authentication information corresponding to the second identification image, compare the second identity authentication information with the first identity authentication information, and determine whether the display of the display terminal 101 is correct according to a comparison result.

In the embodiments of the present disclosure, the content played by the display terminal 101 is monitored in time without affecting play content of the multimedia file. Specifically, by capturing the image currently displayed by the display terminal 101 and further analyzing the display image, whether the display image of the display terminal 101 is correct can be quickly monitored, which greatly improves security of multimedia broadcast monitoring. Compared with the traditional solution of manual patrol, the system provided by the embodiments of the present disclosure can reduce a cost for multimedia broadcast monitoring and has better real-time performance; and compared with the solution of optical broadcast monitoring with the camera disposed outside the display screen, the multimedia broadcast monitoring system 100 provided by the embodiments of the present disclosure belongs to a system built-in multimedia broadcast monitoring algorithm, and can efficiently realize multimedia broadcast monitoring using background data processing with no need for external detection equipment.

The display terminal 101 performs display in response to the data to be displayed, captures the current display image at the preset frequency, and sends the display image to the analysis module 13. The display terminal 101 may include a display screen for displaying images corresponding to the multimedia file. Specifically, in response to the data to be displayed, the display terminal 101 controls playing of the multimedia file using a playback card in the display terminal 101, and captures the image currently displayed on the display screen at the preset frequency, and the image is used as the display image for subsequent timely monitoring of correctness of the multimedia content currently played by the display terminal 101.

Figure 2:
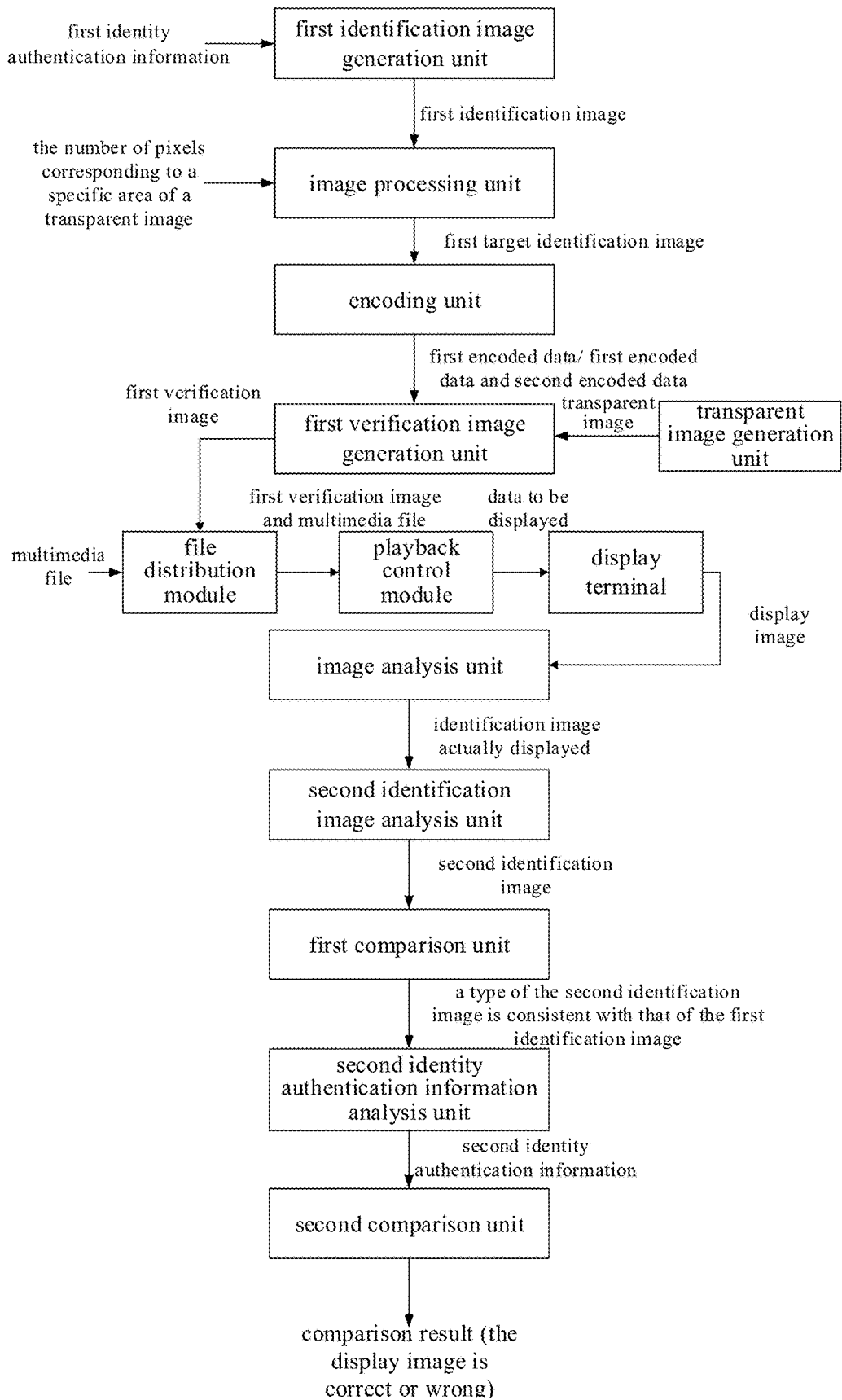
FIG. 2 is a schematic diagram of a processing process of a verification image generation module according to an embodiment of the present disclosure.

FIG. 2 is a schematic diagram of a processing process of the verification image generation module 11 according to an embodiment of the present disclosure. As shown in FIG. 2, the verification image generation module 11 includes a first identification image generation unit, an image processing unit, an encoding unit, and a first verification image generation unit.

The first identification image generation unit is configured to generate the first identification image according to the first identity authentication information.

Specifically, the first identification image generation unit is configured to use an identification generation function to arrange identifiers of the first identity authentication information according to a specific rule, and generate the first identification image according to a specific geometric pattern.

In an exemplary embodiment, the identification generation function may be a two-dimensional code generation function, and the first identification image generation unit is configured to call the two-dimensional code generation function to generate an image of an identity information two-dimensional code having a resolution of L1*L1, and the image of the identity information two-dimensional code is the first identification image.

In the embodiments of the present disclosure, by representing the first identity authentication information with the identity information two-dimensional code, encoding protection of the first identity authentication information can be realized, and robustness of the first identity authentication information can be enhanced, that is, the first identity authentication information can be prevented from being noise-polluted in storage and transmission processes, so as to avoid an information extraction failure such caused.

The image processing unit is configured to process the first identification image according to the number of pixels corresponding to a specific area of a pre-generated transparent image to obtain a first target identification image.

The transparent image may be generated in advance by a transparent image generation unit in the verification image generation module 11. The specific area of the transparent image may be an area set in advance, and a range of the area may be set according to actual application scenarios and experience. The transparent image has a central area and an edge area surrounding the central area, and the specific area may include the edge area of the transparent image, or a corner area of the transparent image, or an irregular-shaped set area of the transparent image.

Specifically, the image processing unit is configured to process the first identification image according to the number of the pixels corresponding to the specific area of the pre-generated transparent image, so as to make the number of pixels in the obtained first target identification image be less than or equal to the number of the pixels corresponding to the specific area of the transparent image.

Taking a case where the first identification image is an image (hereinafter referred to as an identity information two-dimensional code) corresponding to an identity information two-dimensional code as an example, the identity information two-dimensional code is scaled according to the number of the pixels corresponding to the specific area of the pre-generated transparent image to obtain the first target identification image with the scaled identity information two-dimensional code.

For example, resolution information of the identity information two-dimensional code is $L1*L1=N1$ pixels; if the number $N1$ of the pixels of the identity information two-dimensional code is greater than or equal to the number $N'$ of the pixels corresponding to the specific area of the transparent image, the resolution of the identity information two-dimensional code is proportionally reduced to $L2*L2$ to obtain the first target identification image having a resolution of $L2*L2$, where $L2*L2=N2 \leq N'$ and $L2$ is the largest one among the positive integers less than or equal to $\sqrt{N'}$; and if the number $N1$ of the pixels of the identity information two-dimensional code is less than or equal to the number of the pixels corresponding to the specific area of the transparent image, the resolution of the identity information two-dimensional code is proportionally increased to $L2*L2$ to obtain the first target identification image having the resolution of $L2*L2$, where $L2*L2=N2 \leq N'$, and $L2$ is the largest one among the positive integers less than or equal to $\sqrt{N'}$.

The encoding unit is configured to encode display information of each pixel of the first target identification image to obtain first encoded data.

The display information includes information of a color displayed by the first target identification image, and may include information of different colors, which, for example, include, but are not limited to, black and white. The encoding unit is configured to encode the display information of each pixel of the first target identification image, and different pieces of display information may be encoded as different first encoded data, for example, a black pixel may be encoded as first encoded sub-data (e.g., 0), and a white pixel may be encoded as second encoded sub-data (e.g., 1).

Figure 3:
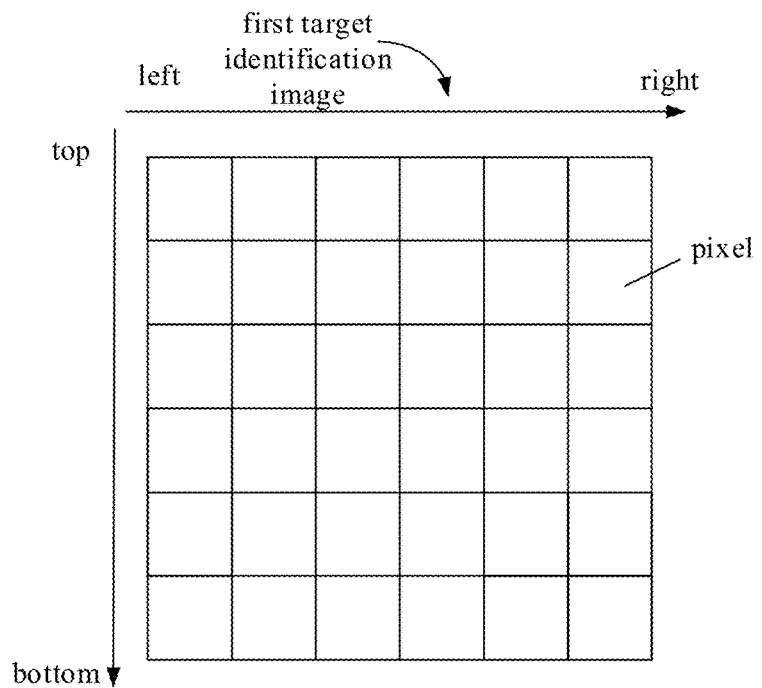
FIG. 3 is a schematic diagram showing an encoding order of a first target identification image according to an embodiment of the present disclosure.

In some exemplary embodiments, the encoding unit is configured to sequentially encode the display information of all pixels of the first target identification image in a first preset order, and obtain the first encoded data arranged in a preset order. FIG. 3 is a schematic diagram showing an order in which the first target identification image is encoded according to an embodiment of the present disclosure. As shown in FIG. 3, the first preset order may be from left to right and from top to bottom, so that all pixels of the first target identification image are sequentially traversed and encoded, and the first encoded data of all pixels are recorded in the preset order.

The first verification image generation unit is configured to replace display data of corresponding pixels in the specific area of the transparent image with the first encoded data to generate the first verification image.

The transparent image is a single-channel image, i.e., an image with an alpha channel. The display data of the corresponding pixels in the specific area of the transparent image may be data in the alpha channel of the transparent image. For example, the first verification image generation unit is configured to replace the data in the alpha channel of the corresponding pixels in the specific area of the transparent image with the first encoded data to generate the transparent image (i.e., the first verification image) with the scaled identity information two-dimensional code.

In some exemplary embodiments, the first verification image generation unit is configured to sequentially replace the display data of the corresponding pixels in the specific area of the transparent image with the first encoded data in a second preset order to generate the first verification image.

Figure 4:
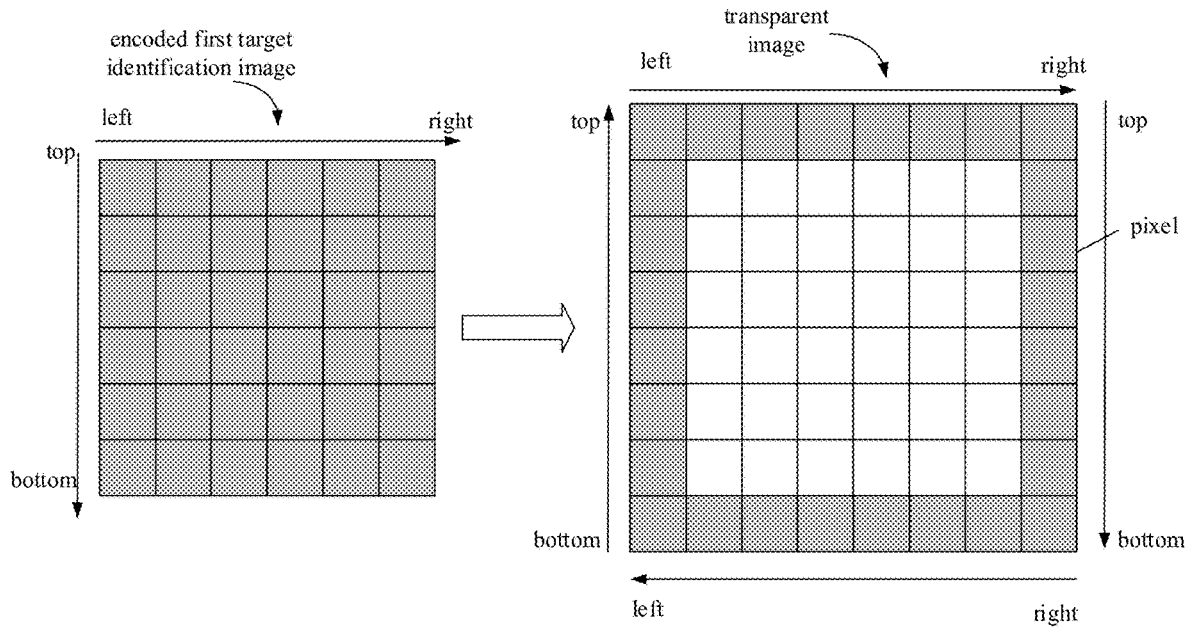
FIG. 4 is a schematic diagram showing an order in which a transparent image is replaced with first encoded data according to an embodiment of the present disclosure.

Taking a case where the specific area of the transparent image is an edge area as an example, the first encoded data of all pixels of the first target identification image recorded in the preset order may be used to sequentially replace the display data of all pixels in the edge area of the transparent image in an order which is from left to right, from top to bottom, from right to left, and from bottom to top, thereby generating the transparent image (i.e., the first verification image) with the scaled identity information two-dimensional code. FIG. 4 is a schematic diagram showing an order in which the transparent image is replaced with the first encoded data according to an embodiment of the present disclosure. As shown in FIG. 4, according to an order which is from top to bottom, from right to left, and from bottom to top of the transparent image, the first encoded data of the first target identification image from left to right and from top to bottom sequentially replace display data of pixels of the transparent image from top to bottom, from right to left, from bottom to top, and from bottom to top (the directions of the arrows).

It should be noted that the second preset order in the exemplary embodiment is not limited to "from left to right, from top to bottom, from right to left, and from bottom to top", may be defined according to experience and actual application scenarios, and will not be listed here one by one.

In order to display a relatively regular image on the display terminal 101, when the number of the pixels in the specific area is greater than that of the pixels in the first target identification image, the first verification image generation unit is configured to replace the display data of pixels other than the corresponding pixels of the first target identification image in the specific area of the transparent image with second encoded data while replacing the display data of the corresponding pixels in the specific area of the transparent image with the first encoded data, so as to obtain the first verification image. In some exemplary embodiments, the first verification image generation unit is configured to continue to sequentially replace the display data of the pixels other than the corresponding pixels of the first target identification image in the specific area of the transparent image with the second encoded data according to the second preset order while sequentially replacing the display data of the corresponding pixels in the specific area of the transparent image with the first encoded data according to the second preset order, so as to obtain the first verification image.

The pixels other than the corresponding pixels of the first target identification image are pixels among the N' pixels in the specific area except the pixels corresponding to the N2 pixels in the first target identification image.

Since the second encoded data are not considered in subsequent determination of the correctness of the image displayed by the display terminal 101, the second encoded data may be encoded data randomly set, or may be data the same as the first encoded sub-data or the second encoded sub-data, which is not limited in the embodiments of the present disclosure.

In some exemplary embodiments, for a generation process of the transparent image, specifically, the verification image generation module 11 further includes the transparent image generation unit. The transparent image generation unit is configured to generate the transparent image according to resolution information of the display terminal 101; and the resolution of the transparent image is the same as that of the display terminal 101.

It should be noted that the resolution of the transparent image may be different from that of the display terminal 101, for example, positions of the pixels of the transparent image are located at positions of some pixels in the display terminal 101.

As shown in FIG. 2, the analysis module 13 includes an image analysis unit, a second identification image analysis unit, a first comparison unit, a second identity authentication information analysis unit, and a second comparison unit.

The image analysis unit is configured to analyze a display image to obtain an identification image actually displayed by the display terminal 101.

Specifically, the image analysis unit is configured to extract, according to a position range of the pixels corresponding to the specific area of the pre-generated transparent image, display data of each pixel of the display image corresponding to the position range to obtain the identification image actually displayed by the display terminal 101.

In some exemplary embodiments, in the case where the first verification image generation unit is configured to sequentially replace the display data of the corresponding pixels in the specific area of the transparent image with the first encoded data in the second preset order to generate the first verification image, the image analysis unit is configured to sequentially extract display data of corresponding pixels in a specific area (that is, an area corresponding to the position range of the pixels of the specific area of the transparent image) of the display image in the second preset order, and obtain the identification image actually displayed by the display terminal 101 according to the extracted display data.

When generating the first verification image by the first verification image generation unit, a case where the specific area of the transparent image is the edge area and the second preset order is from left to right, from top to bottom, from right to left, and from bottom to top is taken as an example, and in this exemplary embodiment, display data of corresponding pixels in an edge area of the display image may be sequentially extracted from left to right, from top to bottom, from right to left, and from bottom to top, and the identification image actually displayed by the display terminal 101 can be obtained according to the extracted display data.

It should be noted that a replacement rule (that is, the way of sequentially replacing in the second preset order) for replacing the transparent image with the first encoded data by the first verification image generation unit is the same as an extraction rule (that is, the way of extracting in the second preset order) for extracting the display data of the pixels of the display image by the image analysis unit.

The second identification image analysis unit is configured to process the identification image actually displayed, and obtain a second identification image according to resolution information of the first identification image.

Figure 5:
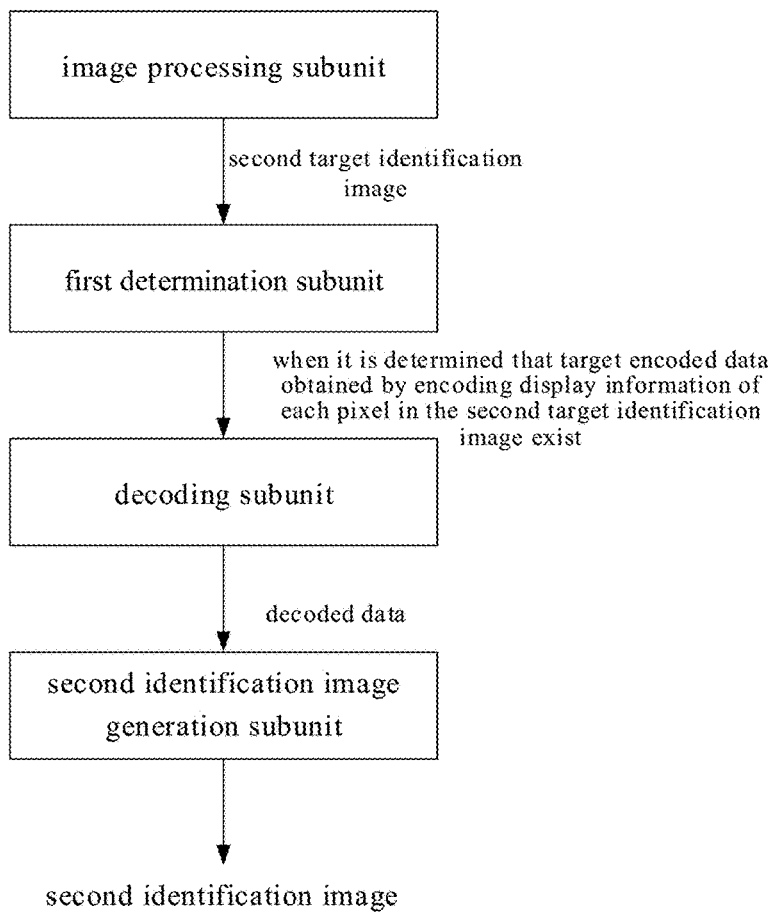
FIG. 5 is a schematic diagram of a processing process of a second identification image analysis unit according to an embodiment of the present disclosure.

FIG. 5 is a schematic diagram of a processing process of the second identification image analysis unit according to an embodiment of the present disclosure. The second identification image analysis unit includes an image processing subunit, a first determination subunit, a decoding subunit, and a second identification image generation subunit, and the identification image actually displayed is processed by subunits of the second identification image analysis unit as follows.

the image processing subunit is configured to process, according to the number of the pixels corresponding to the specific area of the transparent image, the identification image actually displayed to obtain a second target identification image. Specifically, the image processing subunit is configured to assemble display data of all pixels in the identification image actually displayed according to the number of the pixels corresponding to the specific area of the transparent image to obtain the second target identification image.

For example, the number of the display data of all pixels in the identification image actually displayed is N3, the number of the pixels corresponding to the specific area of the transparent image is N', and N3=N'. In the process of assembling the display data, resolution L3*L3 of the second target identification image satisfies L3*L3=N4≤N', and L3 is the largest one among the positive integers less than or equal to $\sqrt{N'}$.

In some exemplary embodiment, the encoding unit is configured to sequentially encode the display information of all pixels of the first target identification image in the first preset order, and obtain the first encoded data arranged in the preset order. In the process of assembling the data by the image processing subunit, the display data of all pixels in the identification image actually displayed may be sequentially assembled in the first preset order, and if the resolution L3*L3 of the second target identification image satisfies L3*L3=N4<N', display data of pixels in the identification image actually displayed which are not assembled are deleted, so as to obtain the second target identification image.

The display image captured from the display terminal 101 may include an uncoded image, and a reason for the existence of the uncoded image may be that a currently played multimedia file does not belong to the multimedia files in the play plan, that is, the play content is not correct. Or, the reason may be that the display image captured is incomplete due to a hardware problem of the display terminal 101 though the multimedia file played by the display terminal 101 is the multimedia file in the play plan, and the captured display image may lack an encoded part of the image. Therefore, the first determination subunit in the second identification image analysis unit is used for preliminarily verifying the second target identification image. Specifically, the first determination subunit is configured to determine whether target encoded data obtained by encoding display information of each pixel in the second target identification image exist. If it is determined that the target encoded data obtained by encoding the display information of each pixel in the second target identification image do not exist, the display image is not correct.

When the number of the pixels in the specific area is equal to the number of the pixels in the first target identification image, the target encoded data are the first encoded data; and when the number of the pixels in the specific area is larger than the number of the pixels in the first target identification image, the target encoded data include the first encoded data and the second encoded data.

The decoding subunit is configured to decode, when it is determined that the target encoded data obtained by encoding the display information of each pixel in the second target identification image exist, the target encoded data to obtain decoded data.

Different target encoded data may be decoded into different pieces of display information (i.e., the decoded data). For example, the first encoded sub-data is decoded into black, the second encoded sub-data is decoded into white (first decoded sub-data), and the second encoded data is decoded into black (second decoded sub-data).

The second identification image generation subunit is configured to generate the second identification image according to the resolution information of the first identification image and the decoded data.

Specifically, the second identification image generation subunit is configured to scale, according to the resolution information of the first identification image, the second target identification image which has the decoded data after being decoded, so as to make resolution L4*L4 of the scaled second identification image be the same as the resolution L1*L1 of the first identification image.

Under the condition that the first target identification image has the scaled identity information two-dimensional code and the play plan is normal, the second target identification image has a two-dimensional code corresponding to the decoded data. The second identification image generation subunit is configured to scale the two-dimensional code corresponding to the decoded data according to the resolution information of the first identification image to obtain the second identification image.

The scaling way here is the same as the above way of "scaling the identity information two-dimensional code to obtain the first target identification image with the scaled identity information two-dimensional code". If the resolution L3*L3 of the second target identification image which has the decoded data after being decoded is less than L1*L1, the second target identification image is enlarged according to the resolution L1*L1 of the first identification image, for example, pixels are filled by interpolation until the resolution of the obtained second identification image is the same as that of the first identification image. If the resolution L3*L3 of the second target identification image which has the decoded data after being decoded is greater than L1*L1, the second target identification image is reduced according to the resolution L1*L1 of the first identification image, for example, some pixels are deleted until the resolution of the obtained second identification image is the same as that of the first identification image.

The first comparison unit is configured to compare a type of the second identification image with that of the first identification image. If the two types are not consistent with each other, the display image is wrong.

Specifically, the type of the first identification image is a two-dimensional code, it is determined that the type of the second identification image is consistent with that of the first identification image if the type of the second identification image is also the two-dimensional code, and it is determined that the type of the second identification image is not consistent with that of the first identification image if the type of the second identification image is not the two-dimensional code. Specifically, the first comparison unit is configured to read two-dimensional code information of the second identification image by using a two-dimensional code reading function; and if the reading is successful, it is indicated that the second identification image is an image of the type of two-dimensional code; and if the reading fails, it is indicated that the type of the second identification image is not the two-dimensional code, and then it is determined that the display image is wrong.

The second identity authentication information analysis unit is configured to acquire the second identity authentication information according to the second identification image when the type of the second identification image is consistent with that of the first identification image.

Specifically, the second identity authentication information analysis unit is configured to use an identification generation inverse function to inversely analyze the second identification image based on an arrangement made according to a specific rule to obtain the second identity authentication information when the type of the second identification image is consistent with that of the first identification image.

The identification generation inverse function is an inverse operation function of the identification generation function. Taking the second identification image being a two-dimensional code as an example, the identification generation function may be the two-dimensional code generation function, the identification generation inverse function is an inverse operation process of the two-dimensional code generation function, and the two-dimensional code is inversely analyzed through the inverse operation process of the two-dimensional code generation function to obtain the second identity authentication information.

The display image currently played by the display terminal 101 may not be multimedia content corresponding to a preset current play plan, and it may be the case that scheduled play time of the current play plan is disturbed, and the display image currently played by the display terminal 101 is multimedia content corresponding to another play plan in the play schedule. In view of this, the analysis module 13 is provided therein with the second comparison unit configured to compare the second identity authentication information with the first identity authentication information to determine whether the display image is correct.

Specifically, the second comparison unit is configured to compare the second identity authentication information with the first identity authentication information to determine an identity information similarity therebetween, and it is determined that the display image is correct when the identity information similarity is greater than or equal to a preset similarity threshold. It is determined that the display image is wrong when the identity information similarity is less than the preset threshold. The preset similarity threshold may be determined according to actual application scenarios and experience, and is not specifically limited in the embodiments of the present disclosure.

In some exemplary embodiments, the analysis module 13 is further configured to send, when it is determined that the display image is not correct, a control instruction to cancel display to the display terminal 101, so as to cause the display terminal 101 to cancel the display of the display image, and generate an alarm message.

When the display terminal 101 receives the control instruction to cancel display sent by the analysis module 13, the display terminal may turn off the screen using the playback card and generate the alarm message. The alarm message may be displayed on the screen in the form of text, or may be played in the form of alarm sound.

A broadcast monitoring process carried out by all the modules in the multimedia broadcast monitoring system 100 is described in detail below by taking a case where the specific area of the transparent image is the edge area and the first identification image is the identity information two-dimensional code as an example.

The first identification image generation unit is configured to generate the identity information two-dimensional code according to the first identity authentication information.

The transparent image generation unit is configured to generate the transparent image according to the resolution information of the display terminal 101; and the resolution of the transparent image is the same as that of the display terminal 101.

The image processing unit is configured to process the identity information two-dimensional code according to the number of the pixels corresponding to the edge area of the pre-generated transparent image to obtain the first target identification image with the scaled identity information two-dimensional code.

The encoding unit is configured to sequentially encode the display information of all pixels of the first target identification image in the order (i.e., the first preset order) which is from left to right and from top to bottom, for example, a first-color pixel (e.g., a black pixel) is encoded as the first encoded sub-data, and a second-color pixel (e.g., a white pixel) is encoded as the second encoded sub-data. The first encoded data include the first encoded sub-data and the second encoded sub-data.

The first verification image generation unit is configured to sequentially replace the display data of the corresponding pixels in the edge area of the transparent image with the first encoded data in the order which is "from left to right, from top to bottom, from right to left, and from bottom to top", and continue to sequentially replace, when the number of the pixels in the edge area is greater than that of the pixels in the first target identification image, display data of other pixels than the pixels corresponding to the first target identification image in the edge area of the transparent image with the second encoded data according in the order which is "from left to right, from top to bottom, from right to left, and from bottom to top", so as to obtain the first verification image.

The playback control module 12 is configured to generate the data to be displayed according to the received play plan, multimedia file corresponding to the play plan, and first verification image.

Figure 6:
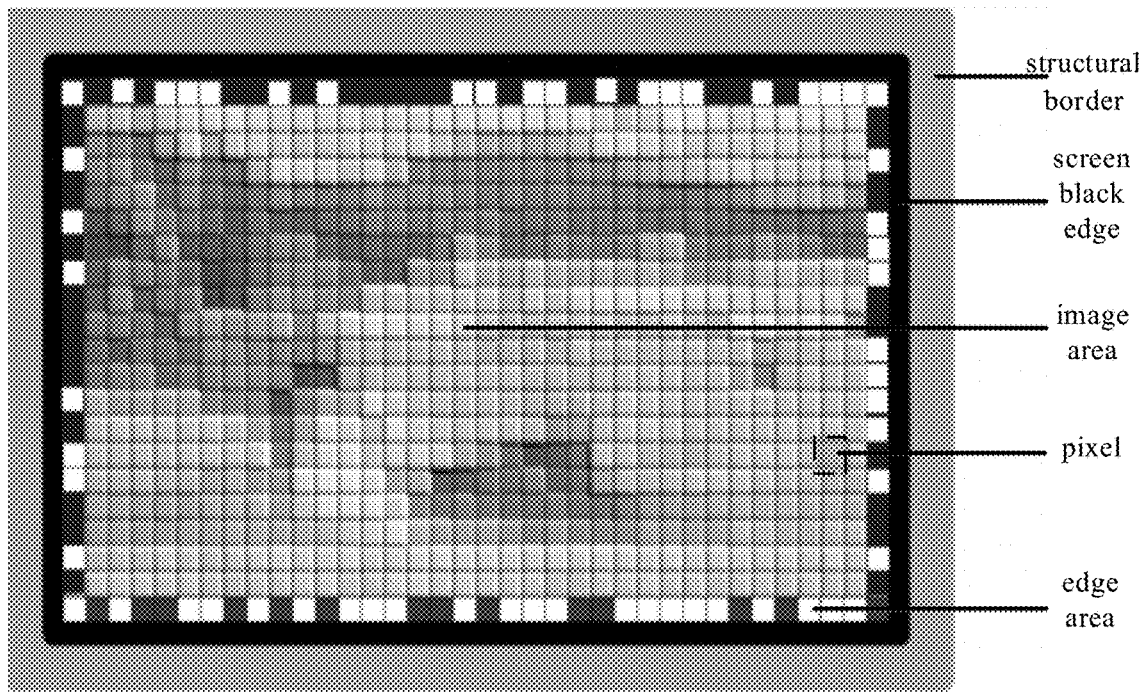
FIG. 6 is a schematic diagram of a display image according to an embodiment of the present disclosure.

Specifically, the display terminal 101 performs display in response to the data to be displayed, captures the currently displayed image at the preset frequency, and the captured image serves as the display image. FIG. 6 is a schematic diagram of a display image according to an embodiment of the present disclosure. As shown in FIG. 6, a display image normally displayed by the display terminal 101 according to the play plan includes a structural border of the display terminal 101, a screen black edge of the display terminal 101, an image area of the display terminal 101, every pixel in the display terminal 101, and an edge area of the display terminal 101.

Taking the specific area of the transparent image being the edge area as an example, the image analysis unit is specifically configured to sequentially extract the display data of the corresponding pixels in the edge area of the display image in the order of "from left to right, from top to bottom, from right to left, and from bottom to top", and obtain the identification image actually displayed by the display terminal 101 according to the extracted display data.

The image processing subunit is configured to sequentially assemble, according to the number of the pixels corresponding to the edge area of the transparent image, the display data of respective pixels in the identification image actually displayed in the order (i.e., the first preset order) of from left to right and from top to bottom, so as to obtain the second target identification image.

The first determination subunit is configured to determine whether the target encoded data (including the first encoded data and the second encoded data) obtained by encoding color information of all pixels in the second target identification image exists.

The decoding subunit is configured to decode, when it is determined that the target encoded data obtained by encoding the color information of all pixels in the second target identification image exist, the target encoded data, for example, the first encoded sub-data is decoded into first color information, the second encoded sub-data is decoded into second color information, and the second encoded data is decoded into third color information (the third color information may be the first color information or the second color information). The decoded data include the first color information, the second color information, and the third color information.

The second identification image generation subunit is configured to scale the second target identification image which has the decoded data after being decoded to generate the second identification image. The resolution information of the second identification image is the same as that of the first identification image.

The first comparison unit is configured to call the two-dimensional code reading function to determine whether the second identification image can be read successfully, and the display image is wrong if the reading fails.

The second identity authentication information analysis unit is configured to acquire the second identity authentication information according to the second identification image when the reading of the second identification image is successful.

The second comparison unit is configured to compare the second identity authentication information with the first identity authentication information to determine whether the display image is correct.

multimedia file displayed by the display terminal 101 is not affected, and the play content of the display terminal 101 can be monitored in time. The specific monitoring process includes: capturing the image currently displayed by the display terminal 101 and further analyzing the display image. In this way, whether the play content is played in a play order and whether the play content is correct can be timely determined, so that the security of multimedia broadcast monitoring is greatly improved. Compared with the traditional solution of manual patrol, the system provided by the embodiments of the present disclosure can reduce the cost for multimedia broadcast monitoring and is high in timeliness; and compared with the solution of optical broadcast monitoring with the camera disposed outside the display screen, the multimedia broadcast monitoring system 100 provided by the embodiments of the present disclosure belongs to the system built-in multimedia broadcast monitoring algorithm, and can efficiently realize multimedia broadcast monitoring using the background data processing with no need for external detection equipment.

In some exemplary embodiments the information management module 14 is configured to encode parameter information in the play plan to generate the first identity authentication information.

The information management module 14 may be an internet web.

With reference to Table One, the parameter information in the play plan includes an identifier of the play plan, the number of multimedia files, a type of a playback window in the display terminal 101, the number of playback windows, an identifier of each multimedia file, a type of each multimedia file, an identifier of a playback window for playing each multimedia file, a play order of all the multimedia files, and the number of times that each multimedia file is played on a loop.

TABLE ONE

| byte | 0-3 | 4 | 5 | 6 | 7-10 |
|---|---|---|---|---|---|
| meaning | play plan identifier | number of multimedia files | type of playback window in display terminal 101 | number of playback windows | identifier of multimedia file |
| default | 1 | 2 | 1 | 1 | 1 |
| default | 2 | 2 | 3 | 2 | x1 |
| default | 3 | M | 3 | 2 | y1 |
| byte | 11 | 12 | 13 | 14 | 15-18 |
| meaning | type of multimedia file | identifier of playback window | play order of multimedia files | loop playback times of multimedia file | identifier of multimedia file |
| default | 1 | 1 | 1 | 1 | 2 |
| default | 4 | 1 | 1 | 1 | x2 |
| default | 2 | 2 | 1 | 1 | y2 |
| byte | 19 | 20 | 21 | 22 | |
| meaning | type of multimedia file | identifier of playback window | play order of multimedia files | loop playback times of multimedia file | ... |
| default | 1 | 1 | 2 | 1 | |
| default | 1 | 1 | 1 | 1 | |
| default | 2 | 1 | 1 | 3 | |

In the above embodiments in which the specific area of the transparent image is the edge area and the first identification image is the identity information two-dimensional code, since the specific area of the transparent image is the edge area, viewing, by a user, the play content of the The information management module 14 is configured to encode the parameter information in the play schedule, with reference to Table One, the bytes 0 to 3 represent the identifier of the play plan, the byte 4 represents the number of the multimedia files, the byte 5 represents the type of the playback window in the display terminal 101, the byte 6 represents the number of the playback windows, the bytes 7 to 10 represent the identifier of the multimedia file, the byte 11 represents the type of the multimedia file, the byte 12 represents the identifier of the playback window for playing the multimedia file, the byte 13 represents the play order of the multimedia files, and the byte 14 represents the number of times that the multimedia file is played on a loop. If one play plan includes a plurality of multimedia files to be played, the subsequent 8 bytes are used to continuously encode the parameter information of the second multimedia file, and so on. One play plan including M multimedia files needs (7+8M) bytes, with the first 7 bytes representing attributes of the play plan, the subsequent 8M bytes representing play information of M multimedia files, and M being a positive integer.

The type of the playback window may be represented by numbers: 1 represents one window; 2 represents two laterally distributed windows; 3 represents two longitudinally distributed windows; 4 represents three windows arranged in one row and laterally distributed; 5 represents three windows arranged in two rows, with the first row including two windows and the second row including one window; and 6 represents three windows arranged in two rows, with the first row including one window and the second row including two windows.

The type of the multimedia file includes at least one of: a video type, an image type, a text type, and an audio type. The type of the multimedia file may be represented by numbers: 1 represents the video type, i.e., .mp4 format; 2 represents the image type, i.e., .jpg format or .png format; 3 represents the text type, e.g., .pptx format, or .txt format; and 4 represents the audio type. i.e., .mp3 format.

For the playback control module 12 described above, in some exemplary embodiments, the play plan includes playback window information and play order information of every multimedia file in the display terminal 101. The playback window information includes an identifier of a playback window, the number of playback windows, and a type of a playback window. The play order information includes a play order of each multimedia file in the play plan.

The display terminal 101 may include at least one playback window, each playback window is capable of independently executing a play plan, or a plurality of playback windows play a multimedia file indicated by one play plan together.

The playback control module 12 is specifically configured to generate the data to be displayed according to display region information and display order information of each multimedia file in the display terminal 101, the multimedia file corresponding to the play plan, and the first verification image. The display terminal 101 is specifically configured to perform display according to the playback window information and the play order information of each multimedia file in the display terminal 101 in response to the data to be displayed.

The multimedia broadcast monitoring system 100 further includes a file distribution module 15. The file distribution module is configured to send the play plan and the multimedia file corresponding to the play plan to the playback control module 12. In some exemplary embodiments, the file distribution module is configured to receive the play schedule sent by the information management module 14, and send the play plan to be currently played and the multimedia file corresponding to the play plan simultaneously to the playback control module 12 according to the play schedule and the play order of all the multimedia files in the play plans.

After the playback control module 12 receives the play plan and the multimedia file corresponding to the play plan, the playback control module 12 is configured to match the multimedia file corresponding to the play plan with the first verification image according to the parameter information of the play plan to be currently display in the playing schedule, and generate the data to be displayed.

Taking the play plan 2 in Table One as an example, the data to be displayed generated by the playback control module 12 include a multimedia file x1, a multimedia file x2, the first verification image, a playback window for the multimedia file x1, a playback window for the multimedia file x2, the loop playback times of the multimedia file x1, and the loop playback times of the multimedia file x2. The display terminal 101 is specifically configured to project, in response to the data to be displayed, the multimedia file x1 (audio) to a playback window in a first row to play, and project the multimedia file x2 (video) to a playback window in a second row to play.

Based on the same inventive concept, an embodiment of the present disclosure further provides a multimedia broadcast monitoring method corresponding to the multimedia broadcast monitoring system 100. Since a problem-solving principle of the multimedia broadcast monitoring method in the embodiment of the present disclosure is similar to that of the multimedia broadcast monitoring system 100 described in the above embodiments of the present disclosure, reference may be made to the implementation of the multimedia broadcast monitoring system 100 for the implementation of the multimedia broadcast monitoring method, and repeated parts will not be described here again.

The multimedia broadcast monitoring method provided by the embodiment of the present disclosure is described below by taking a case where an execution entity is a platform where the multimedia broadcast monitoring system 100 is located as an example.

Figure 7:
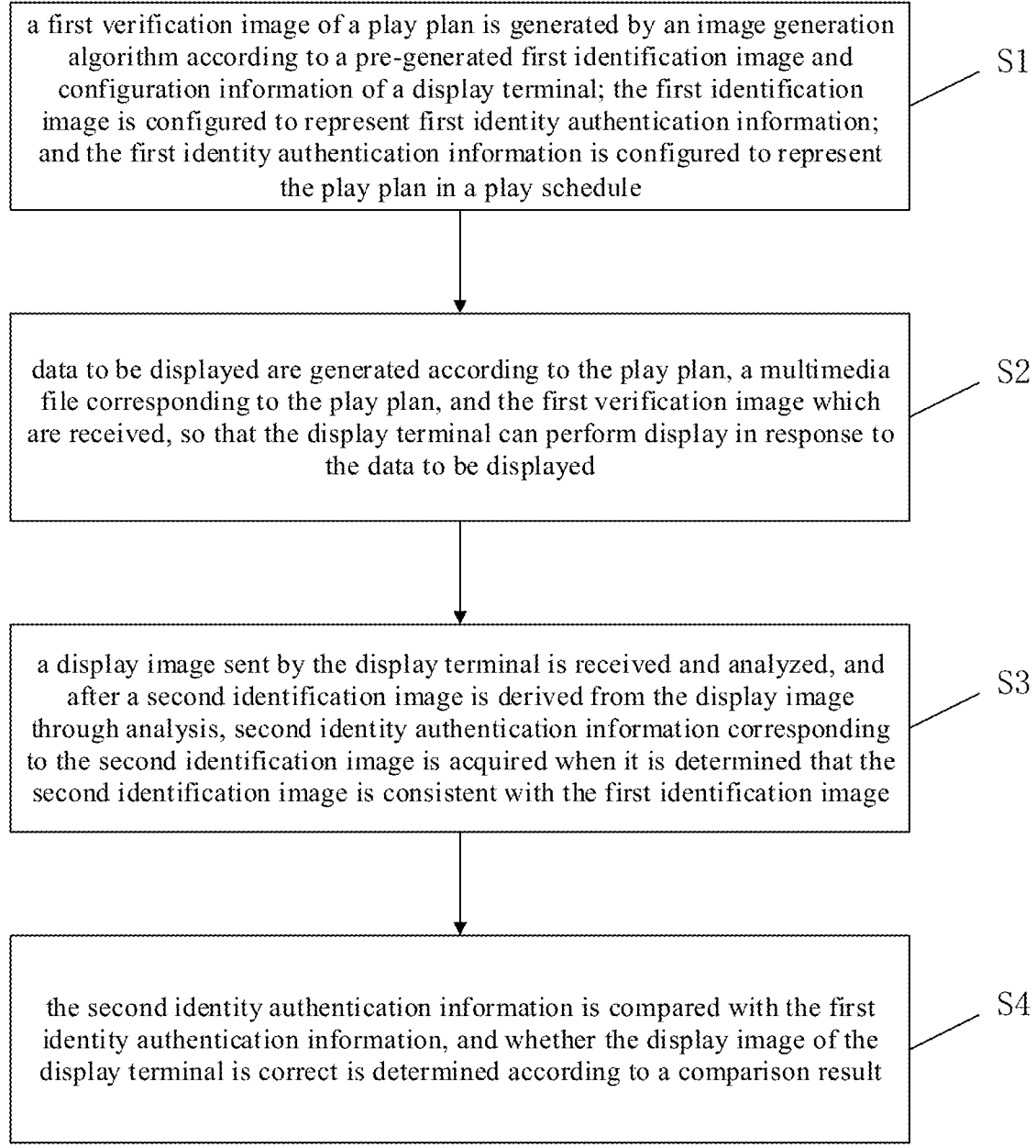
FIG. 7 is a flowchart illustrating a multimedia broadcast monitoring method according to an embodiment of the present disclosure.

In a second aspect, FIG. 7 is a flowchart illustrating the multimedia broadcast monitoring method according to an embodiment of the present disclosure. As shown in FIG. 7, the method includes steps S1 to S4.

In step S1, a first verification image of a play plan is generated by an image generation algorithm according to a pre-generated first identification image and configuration information of a display terminal 101; the first identification image is configured to represent first identity authentication information; and the first identity authentication information is configured to represent the play plan in a play schedule.

In some exemplary embodiments, step S1 may be implemented by the verification image generation module 11 in the multimedia broadcast monitoring system 100 provided by the above embodiments.

In step S2, data to be displayed are generated according to the play plan, a multimedia file corresponding to the play plan, and the first verification image that are received, so that the display terminal 101 performs display in response to the data to be displayed.

In some exemplary embodiments, step S2 may be implemented by the playback control module 12 in the multimedia broadcast monitoring system 100 provided by the above embodiments.

In step S3, a display image sent by the display terminal 101 is received and analyzed, and after a second identification image is obtained from the display image through analysis, second identity authentication information corresponding to the second identification image is acquired after it is determined that the second identification image is consistent with the first identification image.

In step S4, the second identity authentication information is compared with the first identity authentication information, and whether the display image of the display terminal 101 is correct is determined according to a comparison result.

In some exemplary embodiments, steps S3 and S4 may be implemented by the analysis module 13 in the multimedia broadcast monitoring system 100 provided by the above embodiments.

In the embodiment of the present disclosure, the content played by the display terminal 101 is monitored in time without affecting play content of the multimedia file. Specifically, by capturing the image currently displayed by the display terminal 101 and further analyzing the display image, whether the display image of the display terminal 101 is correct can be quickly monitored, which greatly improves the security of multimedia broadcast monitoring. Compared with the traditional solution of manual patrol, the method provided by the embodiment of the present disclosure can reduce the cost for multimedia broadcast monitoring and is high in timeliness; and compared with the solution of optical broadcast monitoring with the camera disposed outside the display screen, the multimedia broadcast monitoring method provided by the embodiment of the present disclosure belongs to the system built-in multimedia broadcast monitoring algorithm, and can efficiently achieve multimedia broadcast monitoring using the background data processing with no need for external detection equipment.

In order to make the multimedia broadcast monitoring method provided by the embodiment of the present disclosure clearer, an exemplary broadcast monitoring method is given below. In a case where the verification image generation module 11 in the above broadcast monitoring system includes a first identification image generation unit, an image processing unit, a transparent image generation unit, an encoding unit, and a first verification image generation unit, and the analysis module 13 in the broadcast monitoring system includes an image analysis unit, a second identification image analysis unit, a first comparison unit, a second identity authentication information analysis unit, and a second comparison unit, the method may be implemented by the multimedia broadcast monitoring system 100, and the following description is given by taking a case where the specific area of the transparent image is an edge area and the first identification image is an identity information two-dimensional code as an example. The method specifically includes the following steps.

In step S101, the first identification image is generated according to first identity authentication information.

In some exemplary embodiments, S101 may be implemented by the first identification image generation unit. Specifically, identifiers of the first identity authentication information are arranged by an identification generation function according to a specific rule, and the first identification image is generated according to a specific geometric pattern.

Illustratively, the identification generation function may be a two-dimensional code generation function. Specifically, the two-dimensional code generation function may be called to generate an image of an identity information two-dimensional code having a resolution of L1*L1, and the image of the identity information two-dimensional code is the first identification image.

In the embodiment of the present disclosure, by representing the first identity authentication information with the identity information two-dimensional code, the encoding protection of the first identity authentication information can be realized, and the robustness of the first identity authentication information can be enhanced, that is, the first identity authentication information can be prevented from being noise-polluted in the storage and transmission processes, so as to avoid an information extraction failure.

The multimedia broadcast monitoring system 100 further includes an information management module 14. The first identity authentication information may be generated by the information management module 14, and specifically, the information management module 14 may encode parameter information in the play plan to generate the first identity authentication information.

In step S102, a transparent image is generated according to resolution information of the display terminal 101; and resolution of the transparent image is the same as that of the display terminal 101.

In some exemplary embodiments, step S102 may be implemented by the transparent image generation unit.

The transparent image has a central area and an edge area surrounding the central area, and the specific area may include the edge area of the transparent image, or a corner area of the transparent image, or an irregular-shaped set area of the transparent image.

In step S103, the first identification image is processed according to the number of pixels corresponding to the specific area of the pre-generated transparent image to obtain a first target identification image.

In some exemplary embodiments, step S103 may be implemented by the image processing unit. Specifically, the identity information two-dimensional code is processed according to the number of the pixels corresponding to the edge area of the pre-generated transparent image to obtain the first target identification image with the scaled identity information two-dimensional code.

Reference may be made to the scaling process of the image processing unit described above for a scaling way here. For example, resolution information of the identity information two-dimensional code is L1*L1=N1 pixels; if the number N1 of the pixels of the identity information two-dimensional code is greater than or equal to the number N' of the pixels corresponding to the specific area of the transparent image, the resolution of the identity information two-dimensional code is proportionally reduced to L2*L2 to obtain the first target identification image having a resolution of L2*L2, where L2*L2=N2≤N', and L2 is the largest one among the positive integers less than or equal to $\sqrt{N'}$; and if the number N1 of the pixels of the identity information two-dimensional code is less than or equal to the number of the pixels corresponding to the specific area of the transparent image, the resolution of the identity information two-dimensional code is proportionally increased to L2*L2 to obtain the first target identification image having the resolution of L2*L2, where L2*L2=N2≤N', and L2 is the largest one among the positive integers less than or equal to $\sqrt{N'}$.

In step S104, display information of each pixel of the first target identification image is encoded to obtain first encoded data.

The display information includes information of a color displayed by the first target identification image, and may include information of different colors, which for example, include, but are not limited to, black and white.

In some exemplary embodiments, step S104 may be implemented by the encoding unit. Specifically, the display information of each pixel of the first target identification image is encoded, and different pieces of display information may be encoded as different first encoded data, for example, a black pixel may be encoded as first encoded sub-data (e.g., 0), and a white pixel may be encoded as second encoded sub-data (e.g., 1).

In some exemplary embodiments, the display information of all pixels of the first target identification image is sequentially encoded in an order (i.e., a first preset order) which is from left to right and from top to bottom, for example, a first-color pixel (e.g., a black pixel) is encoded as the first encoded sub-data, and a second-color pixel (e.g., a white pixel) is encoded as the second encoded sub-data. The first encoded data include the first encoded sub-data and the second encoded sub-data.

In step S105, display data of corresponding pixels in the specific area of the transparent image are replaced with the first encoded data to generate a first verification image.

The transparent image is an image of a single channel, i.e., an image with an alpha channel. The display data of the corresponding pixel in the specific area of the transparent image may be data in the alpha channel of the transparent image. For example, the data in the alpha channel of the corresponding pixels in the specific area of the transparent image are replaced with the first encoded data to generate the transparent image (i.e., the first verification image) with the scaled identity information two-dimensional code.

In some exemplary embodiments, step S105 may be implemented by the first verification image generation unit.

In a specific implementation, the first encoded data sequentially replace the display data of the corresponding pixels in the specific area of the transparent image according to a second preset order to generate the first verification image. In order to display a relatively regular image on the display terminal 101, when the number of the pixels in the specific area is greater than that of the pixels in the first target identification image, display data of pixels other than the corresponding pixels of the first target identification image in the specific area of the transparent image are replaced with second encoded data while the display data of the corresponding pixels in the specific area of the transparent image are replaced with the first encoded data, so as to obtain the first verification image.

The pixels other than the corresponding pixels of the first target identification image are the pixels among the N' pixels in the specific area except the pixels corresponding to the N2 pixels in the first target identification image.

Taking a case where the specific area of the transparent image is the edge area as an example, the first encoded data of all pixels of the first target identification image recorded in the preset order may be used to sequentially replace the display data of all pixels in the edge area of the transparent image in an order which is "from left to right, from top to bottom, from right to left, and from bottom to top", and when the number of the pixels in the edge area is greater than that of the pixels in the first target identification image, the display data of the pixels in the edge area of the transparent image except the pixels corresponding to the first target identification image are continued to be sequentially replaced with the second encoded data in the order which is "from left to right, from top to bottom, from right to left, and from bottom to top", so as to obtain the first verification image.

It should be noted that the second preset order in the exemplary embodiments is not limited to "from left to right, from top to bottom, from right to left, and from bottom to top", may be set according to experience and actual application scenarios, and will not be listed here one by one.

Since the second encoded data are not considered in subsequent determination of the correctness of the image displayed by the display terminal 101, the second encoded data may be encoded data randomly set, or may be data the same as the first encoded sub-data or the second encoded sub-data, which is not limited in the embodiments of the present disclosure.

The multimedia broadcast monitoring system 100 further includes a file distribution module 15, and a step of sending a play plan to be played currently and a multimedia file corresponding to the play plan simultaneously to the playback control module 12 may be implemented by the file distribution module 15.

In step S106, data to be displayed are generated according to a play plan, a multimedia file corresponding to the play plan, and the first verification image that are received.

In some exemplary embodiments, step S106 may be implemented by the playback control module 12. Specifically, the data to be displayed are generated according to display region information and display order information of each multimedia file in the display terminal 101, the multimedia file corresponding to the play plan, and the first verification image, so as to allow the display terminal 101 to perform display according to playback window information and play order information of each multimedia file in the display terminal 101.

The display terminal 101 performs display in response to the data to be displayed, captures a current display image at a preset frequency, and sends the display image to the analysis module 13. The display terminal 101 may include a display screen for displaying images corresponding to the multimedia file. Specifically, in response to the data to be displayed, the display terminal 101 controls playing of the multimedia file using a playback card in the display terminal 101, captures the image currently displayed on the display screen at the preset frequency, and uses the image as the display image for subsequent timely monitoring of the correctness of the multimedia content currently played by the display terminal 101.

In step S107, the display image is analyzed to obtain an identification image actually displayed by the display terminal 101.

In some exemplary embodiments, step S107 may be implemented by the image analysis unit. Taking the specific area of the transparent image being the edge area as an example, the display data of the corresponding pixels in the edge area of the display image are sequentially extracted in the order which is "from left to right, from top to bottom, from right to left, and from bottom to top", and the identification image actually displayed by the display terminal 101 is obtained according to the extracted display data.

In step S108, the identification image actually displayed is processed, and a second identification image is obtained according to resolution information of the first identification image.

In some exemplary embodiments, step S108 may be implemented by the second identification image analysis unit. The second identification image analysis unit includes an image processing subunit, a first determination subunit, a decoding subunit, and a second identification image generation subunit. Step S108 specifically includes the following steps (S108-1 to S108-4).

In step S108-1, the identification image actually displayed is processed according to the number of the pixels corresponding to the specific area of the transparent image to obtain a second target identification image.

In some exemplary embodiments, step S108-1 may be implemented by the image processing subunit. Specifically, display data of all pixels in the identification image actually displayed are assembled according to the number of the pixels corresponding to the specific area of the transparent image to form the second target identification image.

Taking the specific area of the transparent image being the edge area as an example, the display data of all pixels in the identification image actually displayed are sequentially assembled in the order (i.e., the first preset order) of from left to right and from top to bottom according to the number of the pixels corresponding to the edge area of the transparent image, so as to obtain the second target identification image.

The number of the display data of all pixels in the identification image actually displayed is N3, the number of the pixels corresponding to the specific area of the transparent image is N', and N3=N'. In the process of assembling the display data, resolution L3*L3 of the second target identification image satisfies L3*L3=N4≤N' and L3 is the largest one among the positive integers less than or equal to $\sqrt{N'}$.

In some exemplary embodiments, the display information of all pixels of the first target identification image is sequentially encoded in the first preset order to obtain the first encoded data arranged in the preset order. In the process of assembling the data by the image processing subunit, the display data of all pixels in the identification image actually displayed may be sequentially assembled in the first preset order, and if the resolution L3*L3 of the second target identification image satisfies L3*L3=N4<N' the display data of pixels in the actually displayed identification image which are not assembled are deleted, so as to obtain the second target identification image.

In step S108-2, it is determined whether target encoded data obtained by encoding display information of each pixel in the second target identification image exist.

In some exemplary embodiments, step S108-2 may be implemented by the first determination subunit. Specifically, it is determined whether target encoded data (including the first encoded data and the second encoded data) obtained by encoding color information of each pixel in the second target identification image exist. If it is determined that the target encoded data obtained by encoding the display information of each pixel in the second target identification image do not exist, the display image is not correct.

In step S108-3, when it is determined that the target encoded data obtained by encoding the display information of each pixel in the second target identification image exist, the target encoded data are decoded to obtain decoded data.

In some exemplary embodiments, step S108-3 may be implemented by the decoding subunit.

When the number of the pixels in the specific area is equal to the number of the pixels in the first target identification image, the target encoded data are the first encoded data; and when the number of the pixels in the specific area is larger than the number of the pixels in the first target identification image, the target encoded data include the first encoded data and the second encoded data.

Specifically, when it is determined that the target encoded data obtained by encoding the color information of each pixel in the second target identification image exist, the target encoded data are decoded, for example, the first encoded sub-data is decoded into first color information, the second encoded sub-data is decoded into second color information, and the second encoded data is decoded into third color information (the third color information may be the first color information or the second color information). The decoded data include the first color information, the second color information, and the third color information.

In step S108-4, a second identification image is generated according to the resolution information of the first identification image and the decoded data.

In some exemplary embodiments, step S108-4 may be implemented by the second identification image generation subunit. Specifically, the second target identification image which has the decoded data after being decoded is scaled according to the resolution information of the first identification image, so as to make resolution L4*L4 of the scaled second identification image be the same as the resolution L1*L1 of the first identification image.

Under the condition that the first target identification image has the scaled identity information two-dimensional code and the play plan is normal, the second target identification image has a two-dimensional code corresponding to the decoded data. Specifically, the two-dimensional code corresponding to the decoded data is scaled according to the resolution information of the first identification image to obtain the second identification image.

The scaling way here is the same as the above way of "scaling the identity information two-dimensional code to obtain the first target identification image with the scaled identity information two-dimensional code". If the resolution L3*L3 of the second target identification image which has the decoded data after being decoded is less than L1*L1, the second target identification image is enlarged according to the resolution L1*L1 of the first identification image, for example, pixels are filled by interpolation until the resolution of the obtained second identification image is the same as that of the first identification image. If the resolution L3*L3 of the second target identification image which has the decoded data after being decoded is greater than L1*L1, the second target identification image is reduced according to the resolution L1*L1 of the first identification image, for example, some pixels are deleted until the resolution of the obtained second identification image is the same as that of the first identification image.

In step S109, a type of the second identification image is compared with that of the first identification image, and the display image is wrong if the two types are not consistent with each other.

In some exemplary embodiments, step S109 may be implemented by the first comparison unit. Specifically, the type of the first identification image is a two-dimensional code, it is determined that the type of the second identification image is consistent with that of the first identification image if the type of the second identification image is also the two-dimensional code, and it is determined that the type of the second identification image is not consistent with that of the first identification image if the type of the second identification image is not the two-dimensional code. Specifically, a two-dimensional code reading function is used to read two-dimensional code information of the second identification image; and if the reading is successful, it is indicated that the second identification image is an image of the type of two-dimensional code; and if the reading fails, it is indicated that the type of the second identification image is not the two-dimensional code, and then it is determined that the display image is wrong.

In step S110, when the type of the second identification image is consistent with that of the first identification image, second identity authentication information is acquired according to the second identification image.

In some exemplary embodiments, step S110 may be implemented by the second identity authentication information analysis unit.

Specifically, when the second identification image is consistent with the first identification image, an identification generation inverse function is used to inversely analyze the second identification image based on an arrangement made according to a specific rule to obtain the second identity authentication information.

The identification generation inverse function is an inverse operation function of the identification generation function. Taking the second identification image being the two-dimensional code as an example, the identification generation function may be the two-dimensional code generation function, the identification generation inverse function is an inverse operation process of the two-dimensional code generation function, and the two-dimensional code is inversely analyzed through the inverse operation process of the two-dimensional code generation function to obtain the second identity authentication information.

In step S111, the second identity authentication information is compared with the first identity authentication information to determine whether the display image is correct, and the process is ended if it is determined that the display image is correct; and step S112 is performed if it is determined that the display image is wrong.

In some exemplary embodiments, step S111 may be implemented by the second comparison unit.

Specifically, the second identity authentication information is compared with the first identity authentication information to determine an identity information similarity therebetween, and it is determined that the display image is correct when the identity information similarity is greater than or equal to a preset similarity threshold. When the identity information similarity is less than the preset threshold, it is determined that the display image is wrong. The preset similarity threshold may be determined according to actual application scenarios and experience, and is not specifically limited in the embodiments of the present disclosure.

In step S112, when it is determined that the display image is wrong, a control instruction to cancel display is sent to the display terminal 101, so that the display terminal 101 cancels the display of the display image, and generates an alarm message.

In some exemplary embodiments, step S112 may be implemented by the second comparison unit.

When the display terminal 101 receives the control instruction to cancel display sent by the analysis module 13, the display terminal may turn off the screen using the playback card and generate the alarm message. The alarm message may be displayed on the screen in the form of text, or may be played in the form of alarm sound.

Figure 8:
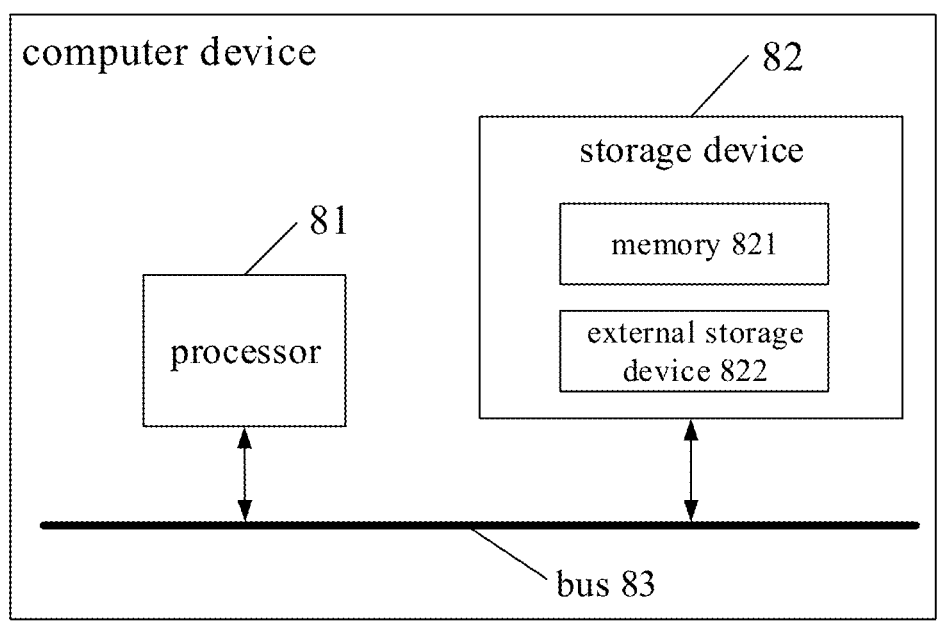
FIG. 8 is a schematic structural diagram of a computer device according to an embodiment of the present disclosure.

Based on the same technical concept, an embodiment of the present disclosure further provides a computer device. With reference to FIG. 8, FIG. 8 is a schematic structural diagram of a computer device according to the embodiment of the present disclosure.

The computer device includes: a processor 81, a storage device 82, and a bus 83. The storage device 82 stores machine-readable instructions executable by the processor 81, the processor 81 is configured to execute the machine-readable instructions stored in the storage device 82, and when the machine-readable instructions are executed by the processor 81, the processor 81 performs the following steps: S1, generating a first verification image of a play plan by an image generation algorithm according to a pre-generated first identification image and configuration information of a display terminal 101, with the first identification image configured to represent first identity authentication information, and the first identity authentication information configured to represent the play plan in a play schedule; S2, generating data to be displayed according to the play plan, a multimedia file corresponding to the play plan, and the first verification image that are received, so as to allow the display terminal 101 to perform display in response to the data to be displayed; S3, receiving a display image sent by the display terminal 101, analyzing the display image, acquiring, after a second identification image is obtained from the display image through analysis and it is determined that the second identification image is consistent with the first identification image, second identity authentication information corresponding to the second identification image; and S4, comparing the second identity authentication information with the first identity authentication information, and determining whether the display image of the display terminal 101 is correct according to a comparison result.

The storage device 82 includes a memory 821 and an external storage device 822. The memory 821 is also called an internal memory and is configured to temporarily store operation data of the processor 81 and data exchanged with the external storage device 822 such as a hard disk. The processor 81 exchanges data with the external storage device 822 through the memory 821. When the computer device operates, the processor 81 communicates with the storage device 82 through the bus 83, so that the processor 81 can execute the execution instructions mentioned in the above method embodiments.

An embodiment of the present disclosure further provides a non-transitory computer-readable storage medium having a computer program stored thereon, and the steps in the multimedia broadcast monitoring method described in the above method embodiments are performed when the computer program is executed by a processor. The storage medium may be a volatile non-transitory computer-readable storage medium or a non-volatile non-transitory computer-readable storage medium.

An embodiment of the present disclosure further provides an electronic device, including the multimedia broadcast monitoring system 100 and the display terminal 101 described in the above embodiments.

It should be understood that the above embodiments are merely exemplary embodiments adopted to illustrate the principle of the present disclosure, and the present disclosure is not limited thereto. Various modifications and improvements can be made by those of ordinary skill in the art without departing from the spirit and essence of the present disclosure, and those modifications and improvements are also considered to fall within the scope of the present disclosure.

What is claimed is:

1. A multimedia broadcast monitoring method, comprising:
    generating a first verification image of a play plan by an image generation algorithm according to a pre-generated first identification image and configuration information of a display terminal; wherein the first identification image is configured to represent first identity authentication information; and the first identity authentication information is configured to represent the play plan in a play schedule;
    generating data to be displayed according to the play plan, a received multimedia file corresponding to the play plan, and the first verification image that are received, so as to allow the display terminal to perform display in response to the data to be displayed;

receiving a display image sent by the display terminal, analyzing the display image, and after a second identification image is derived from the display image through analysis, acquiring second identity authentication information corresponding to the second identification image when it is determined that the second identification image is consistent with the first identification image; and comparing the second identity authentication information with the first identity authentication information, and determining whether the display image of the display terminal is correct according to a comparison result, wherein the play plan comprises playback window information and play order information of each multimedia file in the display terminal; and generating the data to be displayed according to the play plan, the multimedia file corresponding to the play plan, and the first verification image that are received comprises:

generating the data to be displayed according to display region information and display order information of each multimedia file in the display terminal, the multimedia file corresponding to the play plan, and the first verification image, so as to allow the display terminal to perform display according to the playback window information and the play order information of each multimedia file in the display terminal in response to the data to be displayed.

2. The multimedia broadcast monitoring method of claim 1, wherein generating the first verification image of the play plan by the image generation algorithm according to the pre-generated first identification image and the configuration information of the display terminal comprises:

generating the first identification image according to the first identity authentication information;

processing the first identification image according to the number of pixels corresponding to a specific area of a pre-generated transparent image to obtain a first target identification image;

encoding display information of all pixels of the first target identification image to obtain first encoded data; and replacing display data of corresponding pixels in the specific area of the transparent image with the first encoded data to generate the first verification image.

3. The multimedia broadcast monitoring method of claim 2, after generating the first identification image according to the first identity authentication information, further comprising:

generating the transparent image according to resolution information of the display terminal; wherein resolution of the transparent image is the same as resolution of the display terminal.

4. The multimedia broadcast monitoring method of claim 2, wherein the transparent image has a central area and an edge area surrounding the central area; and the specific area is the edge area.

5. The multimedia broadcast monitoring method of claim 2, wherein when the number of the pixels in the specific area is greater than the number of pixels in the first target identification image, replacing the display data of the corresponding pixels in the specific area of the transparent image with the first encoded data to generate the first verification image comprises:

replacing display data of other pixels than the corresponding pixels of the first target identification image in the specific area of the transparent image with second encoded data while the display data of the corresponding pixels in the specific area of the transparent image are replaced with the first encoded data, so as to obtain the first verification image.

6. The multimedia broadcast monitoring method of claim 2, wherein a step of analyzing the display image to determine whether the display image of the display terminal is correct comprises:

analyzing the display image to obtain an identification image actually displayed by the display terminal;

processing the identification image actually displayed, and obtaining the second identification image according to resolution information of the first identification image;

comparing the second identification image with the first identification image, and determining that the display image is wrong if the second identification image is not consistent with the first identification image;

acquiring the second identity authentication information according to the second identification image if the second identification image is consistent with the first identification image; and comparing the second identity authentication information with the first identity authentication information to determine whether the display image is correct.

7. The multimedia broadcast monitoring method of claim 6, wherein processing the identification image actually displayed, and obtaining the second identification image according to the resolution information of the first identification image comprises:

processing the identification image actually displayed according to the number of the pixels corresponding to the specific area of the transparent image to obtain a second target identification image;

determining whether target encoded data obtained by encoding display information of all pixels in the second target identification image exist;

decoding the target encoded data to obtain decoded data if it is determined that the target encoded data obtained by encoding the display information of all pixels in the second target identification image exist; and generating the second identification image according to the resolution information of the first identification image and the decoded data.

8. The multimedia broadcast monitoring method of claim 7, wherein encoding the display information of all pixels of the first target identification image to obtain the first encoded data comprises:

sequentially encoding the display information of all pixels of the first target identification image in a first preset order to obtain the first encoded data; and processing the identification image actually displayed according to the number of the pixels corresponding to the specific area of the transparent image to obtain the second target identification image comprises:

sequentially assembling display data of all pixels in the identification image actually displayed in the first preset order according to the number of the pixels corresponding to the specific area of the transparent image, so as to obtain the second target identification image.

9. The multimedia broadcast monitoring method of claim 6, wherein replacing the display data of the corresponding pixels in the specific area of the transparent image with the first encoded data to generate the first verification image comprises:
sequentially replacing the display data of the corresponding pixels in the specific area of the transparent image with the first encoded data in a preset order to generate the first verification image; and
analyzing the display image to obtain the identification image actually displayed by the display terminal comprises:
sequentially extracting the display data of the corresponding pixels in the specific area of the display image in the preset order, and obtaining the identification image actually displayed by the display terminal according to the extracted display data.

10. The multimedia broadcast monitoring method of claim 1, wherein while the display image is analyzed, the method further comprises:
when it is determined that the display image is not correct, sending a control instruction to cancel display to the display terminal, so as to allow the display terminal to cancel display of the display image, and generate an alarm message.

11. The multimedia broadcast monitoring method of claim 1, further comprising:
encoding parameter information in the play plan, and generating the first identity authentication information.

12. A multimedia broadcast monitoring system, comprising a verification image generator, a playback controller, and an analysis processor, wherein
the verification image generator is configured to generate a first verification image of a play plan by an image generation algorithm according to a pre-generated first identification image and configuration information of a display terminal; the first identification image is configured to represent first identity authentication information; and the first identity authentication information is configured to represent the play plan in a play schedule;
the playback controller is configured to generate data to be displayed according to the play plan, a multimedia file corresponding to the play plan, and the first verification image that are received for the display terminal to display; and
the analysis processor is configured to analyze a display image captured by the display terminal at a preset frequency, acquire, after a second identification image is obtained through analysis, second identity authentication information corresponding to the second identification image if it is determined that the second identification image is consistent with the first identification image, compare the second identity authentication information with the first identity authentication information, and determine whether display of the display terminal is correct according to a comparison result,
wherein the play plan comprises playback window information and play order information of each multimedia file in the display terminal; and
the playback controller is configured to:
generate the data to be displayed according to display region information and display order information of each multimedia file in the display terminal, the multimedia file corresponding to the play plan, and the first verification image, so as to allow the display terminal to perform display according to the playback window information and the play order information of each multimedia file in the display terminal in response to the data to be displayed.

13. A computer device, comprising: a processor, a storage device, and a bus, wherein the storage device stores machine-readable instructions executable by the processor, and when the computer device operates, the processor communicates with the storage device through the bus, and the machine-readable instructions perform steps of the multimedia broadcast monitoring method of claim 1 when being executed by the processor.

14. A non-transitory computer-readable storage medium having a computer program stored thereon, wherein the computer program performs steps of the multimedia broadcast monitoring method of claim 1 when being executed by a processor.

15. An electronic device, comprising the multimedia broadcast monitoring system of claim 12 and a display terminal.

* * * * *